(12) United States Patent
Pulnikov et al.

(10) Patent No.: US 7,638,919 B2
(45) Date of Patent: Dec. 29, 2009

(54) STATOR ARRANGEMENT AND ROTOR ARRANGEMENT FOR A TRANSVERSE FLUX MACHINE

(75) Inventors: Andrey Pulnikov, Villingen-Schwenningen (DE); Markus Kloepzig, Forchheim (DE); Peter Borsai, Tuttlingen (DE)

(73) Assignee: Minebea Co., Ltd., Nagano (JP)

( * ) Notice: Subject to any disclaimer, the term of this patent is extended or adjusted under 35 U.S.C. 154(b) by 369 days.

(21) Appl. No.: 11/747,764

(22) Filed: May 11, 2007

(65) Prior Publication Data

US 2007/0267929 A1    Nov. 22, 2007

(30) Foreign Application Priority Data

May 16, 2006    (DE) .................... 10 2006 022 836

(51) Int. Cl.
    *H20K 1/12* (2006.01)
(52) U.S. Cl. .................... 310/257; 310/156.02
(58) Field of Classification Search ........... 310/156.02, 310/114, 257, 164, 49 R
    See application file for complete search history.

(56) References Cited

U.S. PATENT DOCUMENTS

| | | | | |
|---|---|---|---|---|
| 6,160,330 | A * | 12/2000 | Sakamoto | 310/216.097 |
| 6,320,294 | B1 * | 11/2001 | Kliman | 310/257 |
| 6,492,758 | B1 | 12/2002 | Gianni et al. | |
| 6,590,312 | B1 * | 7/2003 | Seguchi et al. | 310/266 |
| 6,657,329 | B2 * | 12/2003 | Kastinger et al. | 310/254.1 |
| 6,946,771 | B2 * | 9/2005 | Cros et al. | 310/257 |
| 7,124,495 | B2 * | 10/2006 | Gieras et al. | 29/596 |
| 2004/0046478 | A1 * | 3/2004 | Zierer et al. | 310/216 |
| 2005/0212381 | A1 | 9/2005 | Gilmour et al. | |
| 2007/0164628 | A1 * | 7/2007 | Fonseca et al. | 310/112 |

FOREIGN PATENT DOCUMENTS

| | | |
|---|---|---|
| DE | 42 13 378 A1 | 4/1992 |
| DE | 199 10 554 A1 | 3/1999 |
| DE | 100 36 288 A1 | 7/2000 |

* cited by examiner

*Primary Examiner*—Michael C Zarroli
(74) *Attorney, Agent, or Firm*—Duane Morris LLP (57) ABSTRACT

A stator arrangement and a rotor arrangement for a transverse flux machine. The stator arrangement comprises an annular stator back yoke having a number of stator poles designed in the manner of claw poles. The rotor arrangement includes number of rotor poles designed in the manner of claw poles and connected to each other to form an annular rotor body enclosing a unipolar ring magnet magnetized in an axial direction. In the stator arrangement, the stator back yoke includes a first laminated stack of metal sheets whose laminations are stacked in an axial direction, and the stator poles include a second laminated stack of metal sheets whose laminations are stacked in a tangential direction. In the rotor arrangement, the rotor poles include laminated stacks of metal sheets whose laminations are stacked in a tangential direction.

11 Claims, 13 Drawing Sheets

STATOR ARRANGEMENT AND ROTOR ARRANGEMENT FOR A TRANSVERSE FLUX MACHINE

This application claims priority to the filing date of German Patent Application No. 10 2006 022 836.7 filed May 16, 2006 the disclosure of which is incorporated herein by reference.

The invention relates to a stator arrangement as well as a rotor arrangement for a transverse flux machine wherein the stator poles and/or rotor poles are designed in the manner of claw poles.

BACKGROUND

U.S. Pat. No. 6,492,758 describes an electronically commutated transverse flux motor having a multiple phase stator. The stator is formed from two complementary facing pieces each carrying half the stator poles that are designed in the manner of claw poles. The stator windings are sandwiched between these two pieces and are encompassed by the opposing claw poles. In this document, the advantages of transverse flux machines are touched on briefly. A transverse flux machine is capable of producing power densities that are several times greater than conventional radial flux machines. This arises from the geometry of transverse flux machines which makes it possible to have a larger number of poles while maintaining the same magnet-to-magnet force per pole than would be possible in a conventional machine. Due to their three dimensional geometric form, however, it is difficult to construct transverse flux machines using standard core lamination techniques, since a laminated stator body would impede the necessary three-dimensional magnetic flux. This difficulty is overcome in U.S. Pat. No. 6,492,758 by the use of sintered powdered iron cores.

For transverse flux machines having a claw pole stator, it is basically known in the prior art to make both the stator back yoke as well as the claw poles out of iron or out of soft magnetic composite materials, particularly powders.

U.S. Pat. No. 6,236,131 describes a different type of transverse flux machine having U-shaped and I-shaped back yokes and a rotor that is made up, as in conventional radial flux machines, of a rotor-back yoke ring and permanent magnets attached thereon. The U-shaped back yokes and the I-shaped back yokes can be manufactured using well-known core lamination techniques, although in practice it is difficult to secure the individual U-shaped and I-shaped back yokes. For this purpose, usually non-magnetic holding pieces are needed to fasten the I-shaped back yokes.

SUMMARY OF THE INVENTION

A similar prior art is disclosed in DE 36 02 687, US 2005/0062352 and DE 196 14 862.

A basic principle for transverse flux machines is that the number of poles for the rotor equals the number of poles for the stator. If a claw pole stator is provided or a stator having U-shaped and I-shaped back yokes with a large number of poles, the associated rotor must have a ring magnet or a number of single magnets that are magnetized with a correspondingly identical number of pole transitions. This may mean that constructing the rotor using a plurality of single magnets or magnetizing a ring magnet accordingly would be a very complex and costly process.

A claw pole synchronous machine is known from U.S. Pat. No. 6,211,596 in which an exciter coil is wound onto a rotor core that has two claw magnet wheels extending in a radial direction from each of which a plurality of claw poles extend. The rotor is basically made of solid material, the claw poles being closed at their outer ends by a laminated stack of metal sheets for the purpose of reducing eddy current losses. In U.S. Pat. No. 6,211,596, the claw pole arrangement is used in order to generate a plurality of rotor poles with one single exciter coil. This arrangement is employed if the large number of poles cannot be realized through other designs and constructions. One of the disadvantages of this arrangement is that it is necessary to provide a connection for the exciter coil.

DE 42 13 378 describes a similar prior art having a claw pole rotor that has a ring magnet and two parallel, ferromagnetic disks, between which the ring magnet is located and which carry claws distributed evenly about their circumference, one claw of one of the disks engaging between two claws of the other disk and all claws together lying on an imaginary circular cylindrical envelope about the ring magnet.

DE 10 2004 029 442 A1 describes a stator arrangement for an electric machine that is made up of individual radial and tangential segments, the tangential segments substantially forming the stator back yoke and the radial segments substantially forming the stator poles. The segments are made of stamped packed metal sheets, the metal sheets being arranged such that they each have a preferred magnetic direction which is the same for all the ring segments.

Further examples of the prior art that concerns the field of the present invention can be found, for example, in DE 100 62 073 and DE 37 05 089.

It is an object of the invention to provide a stator arrangement and a rotor arrangement for a transverse flux machine that, for a comparably large number of poles greater than 40, 60 or 80, can be easily constructed and that show good magnetic and electric properties.

The invention relates to a stator arrangement for a transverse flux machine having an annular stator back yoke and a number of stator poles that are designed in the manner of claw poles. A stator winding is located between the stator back yoke and the stator poles. According to the invention, the stator back yoke is made of a first stack of metal sheets whose laminations are stacked in an axial direction of the stator arrangement, and the stator poles are made of second stacks of metal sheets whose laminations are stacked in a tangential direction. The stator back yoke and the individual stator poles are preferably connected to each other by a plug-in connection using recesses and corresponding projections. To this effect, the stator back yoke can be provided with appropriate recesses at its circumference, and the stator poles designed with corresponding projections that come to engage into these recesses. The stator poles are designed with stator bridges, for example, on one of whose ends flux receivers or pole shoes (the claws) are formed and on whose other end the projections for connection to the stator back yoke are formed.

Depending on whether the stator arrangement is intended for an inner rotor or an outer rotor motor, a stator sleeve can be disposed on the outside circumference or the inside circumference respectively of the stator arrangement, the stator sleeve fixing the stator poles to the back yoke ring.

Stator poles of different polarity are placed alternately over the stator back yoke from opposite end faces of the stator back yoke in order to form a stator arrangement for one phase of the transverse flux machine. For a multi-phase machine, several stator arrangements are provided in accordance with the number of phases.

The pole claws or pole shoes of the stator poles of different polarity may overlap in an axial direction, either fully or partially.

As mentioned at the outset, in the prior art the claw poles and the back yoke of a claw pole stator are made of solid iron or soft magnetic composite material, particularly powdered materials.

The invention thus provides a solution in which a claw pole stator can be made of laminated stacks of metal sheets with the claw poles and the stator back yoke having different directions of lamination. The lamination directions are chosen such that optimum conduction of the magnetic flux in the stator poles is ensured. Stacking the laminations in a tangential direction enables the current flowing through the stator winding to generate a circumferential magnetic field in the stator poles, whereas stacking the stator back yoke in an axial direction prevents this kind of magnetic field from being generated. At the same time, this gives the stator arrangement according to the invention a simple construction, allowing it to be manufactured using well-known stamped sheet metal and lamination techniques. Although the stator cannot be made from a uniform sheet metal blank due to its three-dimensional design, the invention only requires two different blanks for its realization. The stator arrangement is made up of simple pieces that can be manufactured without any great waste and is thus suitable for mass production. It does not require any expensive materials or manufacturing processes. Practical testing has further shown that it is possible to achieve higher motor performance using the stator design according to the invention than can be achieved using known claw pole stators made of solid material.

The stator arrangement according to the invention is preferably assembled as follows: the stator poles of one polarity are held in an assembly tool, either at their outside circumference when an outer rotor machine is to be produced or at their inside circumference when an inner rotor machine is to be produced. The stator back yoke is mounted onto the stator poles in that the projections are inserted into corresponding recesses on the outside circumference, or inside circumference respectively, of the stator back yoke. If this is effected using an interference fit, good magnetic contact between the claw poles and the stator back yoke can be accordingly ensured. The winding for one phase is inserted into the half member thus created, and the claw poles of the second polarity are mounted onto this member from the opposite side of the stator back yoke.

The stator poles can be permanently fixed to the stator back yoke by means of an interference fit and/or by bonding or welding. The assembly tool can subsequently be removed. A stator sleeve can be additionally mounted onto the inside circumference (for an outer rotor) or the outside circumference (for an inner rotor) of the stator back yoke for the purpose of fixing the stator poles in the recesses in the stator back yoke.

The invention also provides a rotor arrangement for a transverse flux machine that has two opposing rotor body halves, appropriate rotor poles being formed in the manner of claw poles and connected to each other such that they form an annular rotor body half. A unipolar ring magnet magnetized in an axial direction is located between the rotor poles of the rotor body. According to the invention, the rotor poles are built up of laminated stacks of metal sheets whose laminations are stacked in a tangential direction. In a preferred embodiment, the rotor poles are connected to each other via intermediate wedges. If the economics of the production process has priority, however, the rotor arrangement together with the rotor poles and the intermediate wedges can also be made of solid material, either as a single piece or as several pieces. Like the stator arrangement according to the invention, a rotor sleeve can be provided which, depending on whether the rotor arrangement is intended for an inner rotor or an outer rotor machine, is mounted onto the inside circumference or the outside circumference respectively of the rotor body. Like the stator arrangement according to the invention, the rotor poles of different polarity encompass the ring magnet alternately from opposite end faces of the rotor arrangement. The pole claws of the rotor poles of different polarity can overlap in an axial direction, either partially or fully.

The rotor arrangement according to the invention is particularly suitable for transverse flux machines whose stators are made up of U-shaped and I-shaped back yokes, or which have claw pole stators. In the case of these kinds of stators that can have a large number of poles greater, for example, than 40, 60 or even 80, the construction of the rotor is made difficult if the permanent magnets of the rotor consist of separate segments or parallelepipeds. A rotor arrangement is thus proposed whose rotor poles are constructed in the manner of claw poles, the rotor poles being made up of laminated stacks of metal sheets whose laminations are stacked in a tangential direction for optimum conduction of the magnetic flux. The rotor poles of the rotor arrangement according to the invention are thus constructed in substantially the same way as the stator poles of the stator arrangement according to the invention are constructed. Substantially the same advantages are achieved as well; namely optimum conduction of the magnetic flux and a simple construction using well-known stamped sheet metal and lamination techniques. The rotor can be made up of simple parts with little waste and, like the stator arrangement according to the invention, is thus suitable for mass production. The rotor can be easily assembled using a similar method as the one described for the stator arrangement. Instead of the back yoke, wedges, for example, are placed between the individual rotor poles in order to make up a rotor ring. The rotor sleeve used to fix the rotor arrangement should be made of a non-magnetic material in order to prevent a short circuit between the individual rotor poles. The connecting wedges could also be made of plastics, for example; they are used to mechanically connect the individual rotor poles. Should they be made of metal, out of a laminated stack of metal sheets for example, the direction of lamination is not relevant since these connecting wedges do not conduct any magnetic flux.

The rotor arrangement according to the invention makes it possible to realize a rotor that is based on an easily magnetized unipolar ring magnet. The remanence of the magnetic material can be optimally exploited making it possible to accommodate a greater magnet volume, so that a transverse flux machine having correspondingly greater output power can be produced. As a whole, the rotor arrangement is superior to known rotor arrangements for transverse flux machines where magnetization and the optimal exploitation of the magnet volume is concerned. The claw pole design ensures that the ring magnet is simultaneously protected and fixed.

The invention also provides a transverse flux machine which combines the described stator arrangement and the described rotor arrangement to form one phase of the machine. The stator arrangement and the rotor arrangement are disposed coaxially with respect to one another and the pole claws of the stator poles as well as the pole claws of the rotor poles are located opposite each other at the same angular distance. This design is suitable for both inner rotor as well as for outer rotor machines. It combines the advantages of the stator arrangement according to the invention and the rotor arrangement according to the invention, particularly concerning the simple construction of the stator body and of the rotor body compared to conventional transverse flux machines. Higher energy densities can be achieved using the transverse flux machine according to the invention, with the magnetic material being optimally exploited. Since the direction of lamination of the claw poles is always optimized for the magnetic flux, losses due to magnetic pulsation can be prevented. It is possible to produce transverse flux machines having a large number of poles greater than 40, 60 or even greater than 80 poles without any difficulty.

The invention is described in more detail below with reference to the drawings. The figures show.

BRIEF DESCRIPTION OF THE DRAWINGS

DETAILED DESCRIPTION

Figure 1:
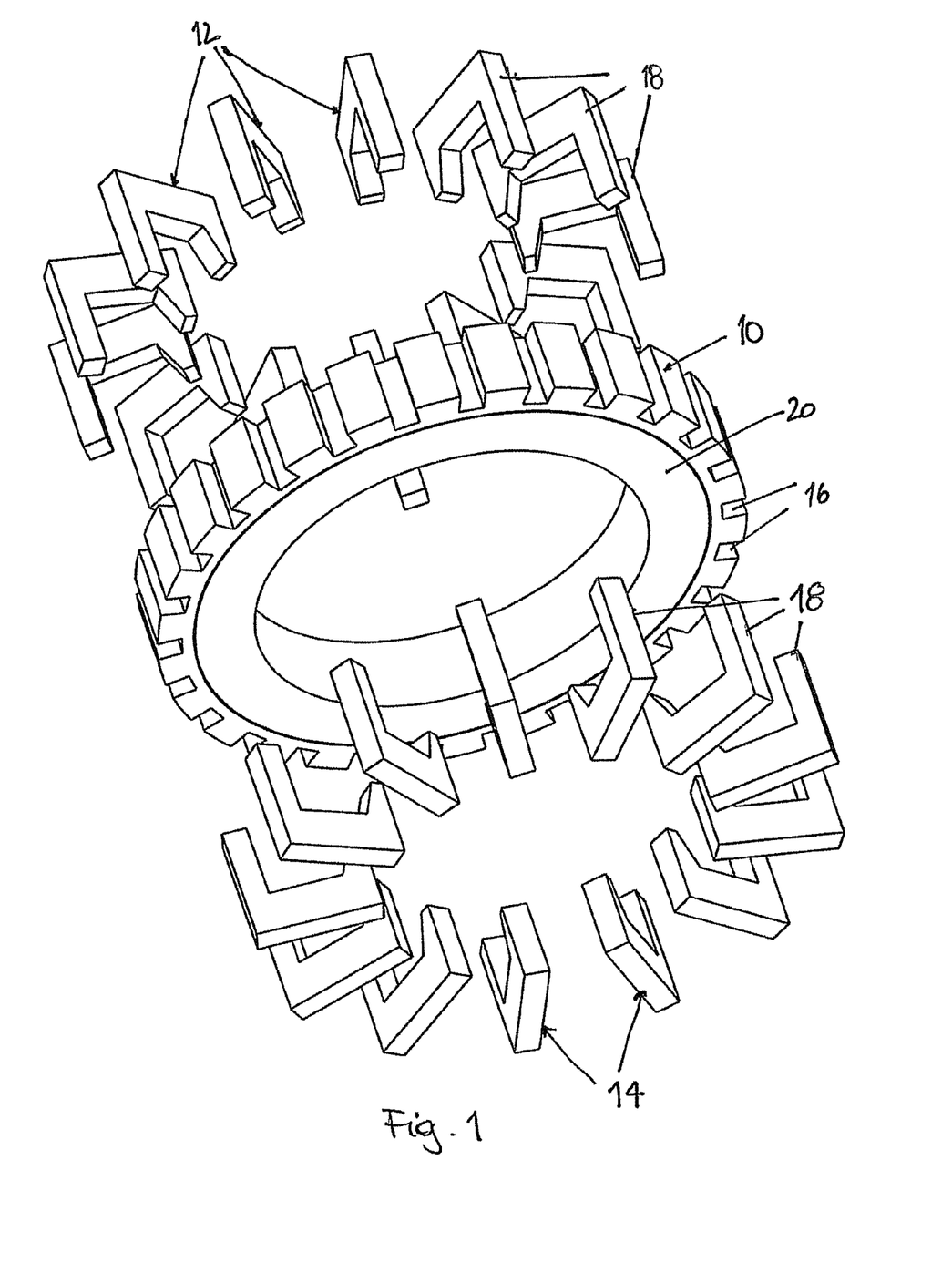
FIG. 1 is a perspective, exploded view of a stator arrangement according to the invention.
Figure 2:
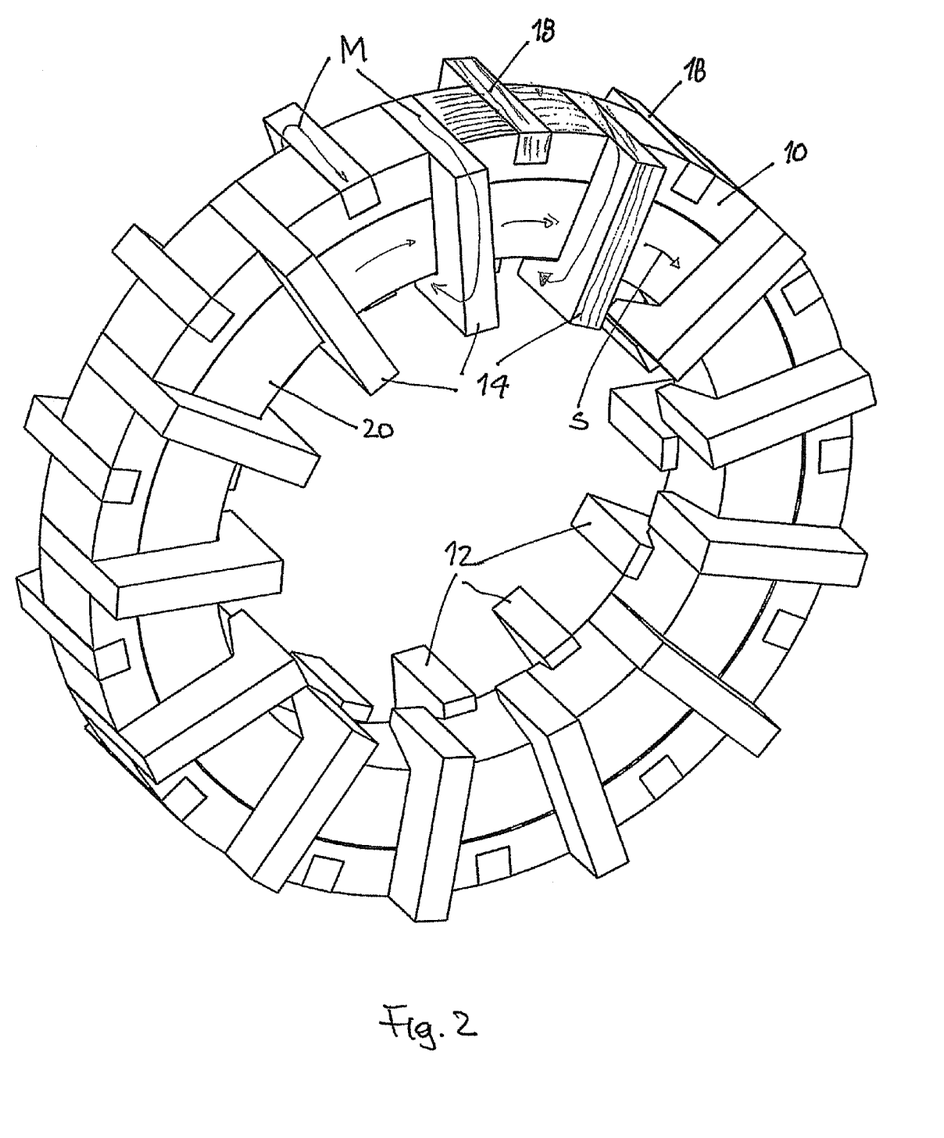
FIG. 2 is a perspective view of the stator arrangement of FIG. 1 in an assembled state.

FIG. 1 shows a perspective, exploded view of a advantageous embodiment of the stator arrangement according to the invention. The stator arrangement comprises an annular stator back yoke 10 as well as a plurality of stator poles 12, 14 that are designed in the manner of claw poles, one half of the stator poles 12 being mounted onto the stator back yoke 10 from one end face of the stator back yoke 10 and the other half of the stator poles 14 being mounted from the opposite end face of the stator back yoke 10. To this effect, recesses 16 are formed in the outside circumference of the stator back yoke 10 into which corresponding projections 18 that are integrally formed on the stator poles 12, 14 engage. The connection is preferably effected using an interference fit. The stator poles encompass a winding 20 that is schematically shown in FIG. 1 as a ring. FIG. 2 shows the stator arrangement according to the invention after the stator poles 12, 14 have been inserted into the stator back yoke 10 from opposite sides.

According to the invention, the stator back yoke 10 and the stator poles 12, 14 are each made of laminated stacks of metal sheets, the direction of lamination being indicated in the figures. Also marked in FIG. 2 is the direction of the flow of current S through the winding 20 as well as the direction of magnetic flux M through the stator poles 12, 14 that are produced when the machine is in operation.

The laminations of the stator back yoke are stacked in an axial direction and the laminations of the stator poles are stacked in a tangential direction. As a result, the conduction of the magnetic field lines through the stator poles is optimized, while the formation of magnetic poles in the stator back yoke 10 is prevented. The individual components can be fabricated using well-known stamped sheet metal and lamination techniques. The stator poles 12, 14 are preferably held in the stator back yoke 10 using an interference fit in order to establish good magnetic contact. They may be additionally bonded or welded. It is further possible to secure the stator poles in the recesses 16 of the stator back yoke by means of a stator sleeve (not illustrated in FIGS. 1 and 2), the sleeve being slid onto the outside circumference of the stator arrangement. This stator sleeve can be a separate component or a part of the housing of the transverse flux machine. It may be made of either magnetic or non-magnetic material.

In a preferred embodiment of the invention, the stator arrangement is assembled as follows: the stator poles 12 of one polarity are held in a circular arrangement in a tool, as shown, for example, in FIG. 1. The stator back yoke 10 with its recesses 16 is slid onto the projections 18 in an axial direction. The winding 20 is then inserted in the winding window thus formed, and the stator poles 14 of the other polarity are mounted onto the stator back yoke 10. The stator poles can subsequently be fixed to the stator back yoke by means of welding, for example, although adhesive bonding is also possible. The tool can then be removed and the stator arrangement may be additionally fixed using a stator sleeve, as described above.

Figure 3:
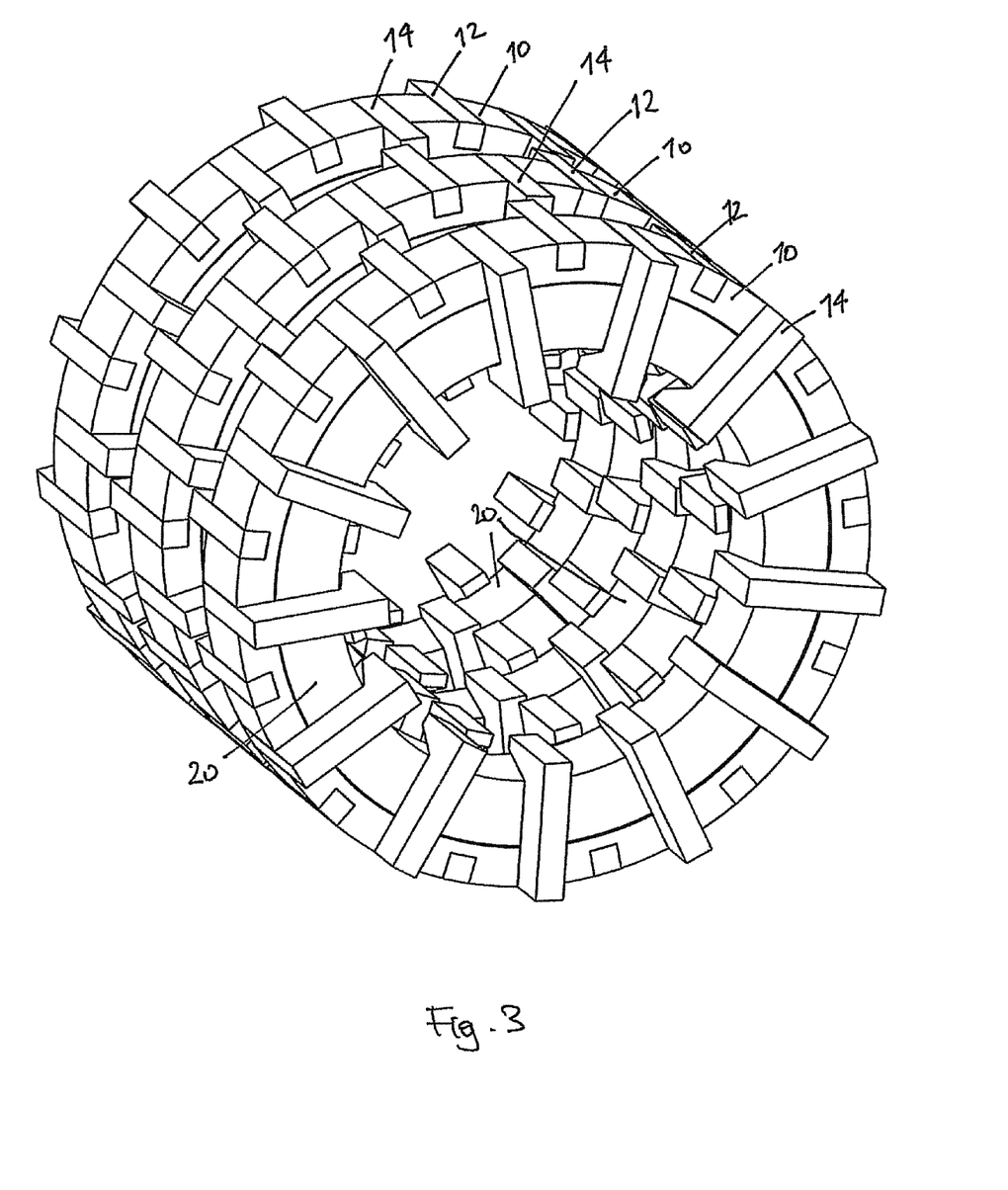
FIG. 3 is a perspective view of three stator arrangements according to the invention for the construction of a three-phase transverse flux machine.

For a three-phase transverse flux machine, three stator arrangements are provided that are arranged coaxially with respect to one another in order to form a stator, as shown in FIG. 3. Here, the stator poles of one phase are preferably offset by approximately 120° to the adjacent phase, in order to minimize cogging torque.

Figure 4:
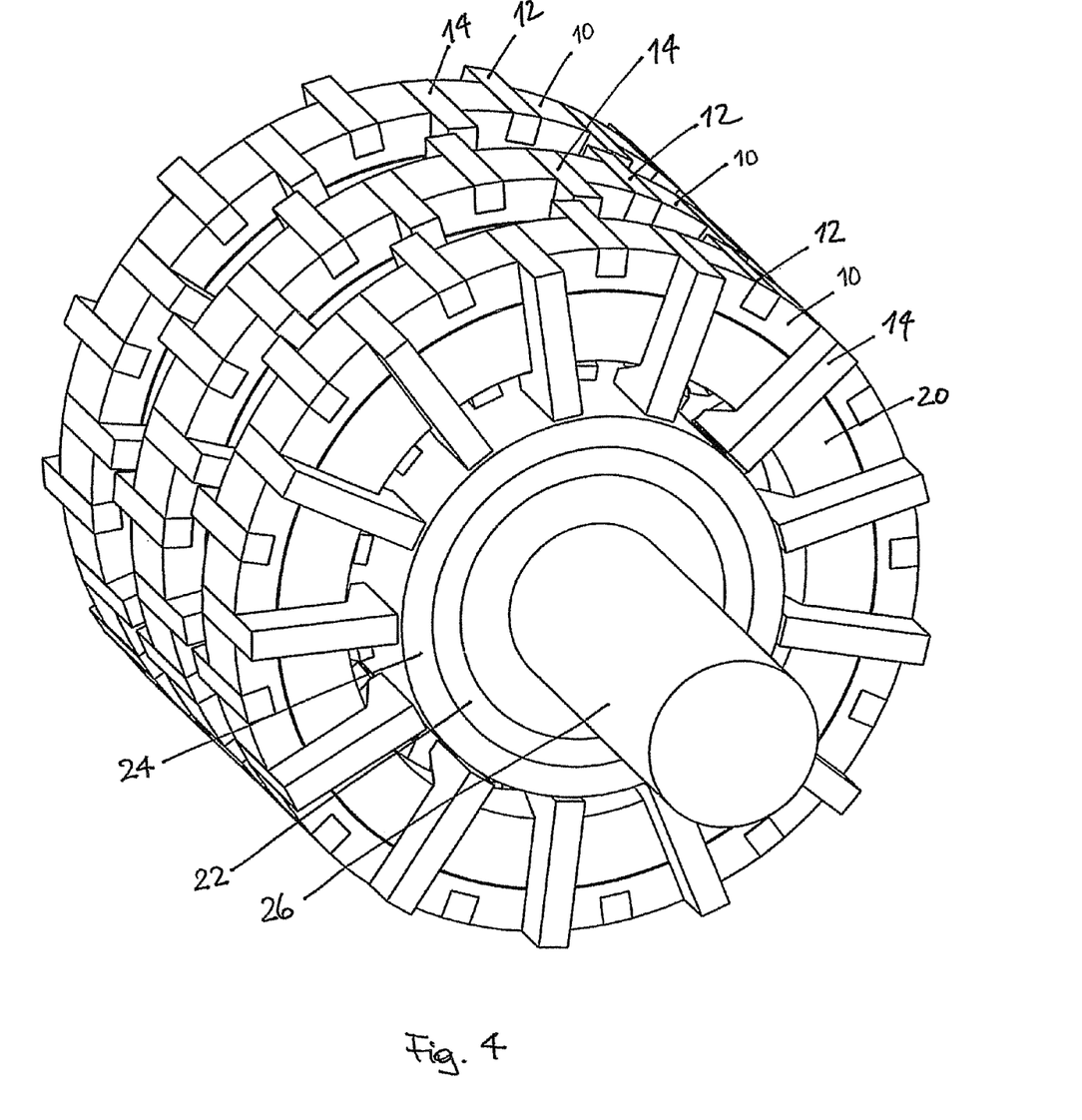
FIG. 4 is a perspective view of three stator arrangements according to invention in conjunction with a conventional rotor for the construction of a three-phase transverse flux machine.

The view shown in FIG. 4 corresponds substantially to that of FIG. 3, a conventional rotor being coaxially inserted into the stator. The rotor can be formed with a rotor back yoke 22 and a permanent magnet ring 24 or a plurality of individual permanent magnets, as is known from the prior art. The rotor is mounted on a shaft 26. In the case of the illustrated transverse flux machine, the permanent magnet ring 24 is divided in an axial direction into three sections that correspond to the three stator arrangements for a three-phase transverse flux machine. Each of the axial sections is in turn segmented in a tangential direction into a number of magnetic regions that correspond to the number of stator poles 12, 14. This is not shown in detail in the figure but is basically known to the person skilled in the art.

FIGS. 5a, 5b, 5c and 5d show various embodiments of the stator arrangement according to the invention for a transverse flux machine in cross-section. The view in FIG. 5a substantially corresponds to the embodiment of FIGS. 1 to 4 in which the stator arrangement is intended for an inner rotor machine. Corresponding parts are designated by the same reference numbers. In the embodiment illustrated in FIG. 5a, the stator poles 12, 14 are designed such that the pole shoes or claws 28 of the opposing stator poles 12, 14 extend to an imaginary center line but do not overlap one another in an axial direction. (The rotational axis of the transverse flux machine is indicated by R). As illustrated in FIGS. 1 to 4, the stator poles 12, 14 are slid onto the stator back yoke ring 10. They are additionally fixed by a sleeve or in the embodiment of FIG. 5*a* by the housing 30 of the transverse flux machine.

Figure 5A:
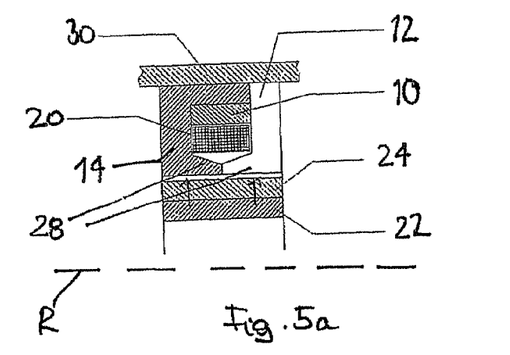
FIGS. 5a, 5b, 5c and 5d are sectional views through various embodiments of the stator arrangement according to the invention.

In the embodiment of FIG. 5*a*, the rotor is depicted by a back yoke ring 22 as well as a permanent magnet ring 24. The permanent magnet ring 24 is magnetized in a radial direction as indicated by arrows. This magnetization changes about the circumference of the rotor in segments corresponding to the number of stator poles.

Figure 5B:
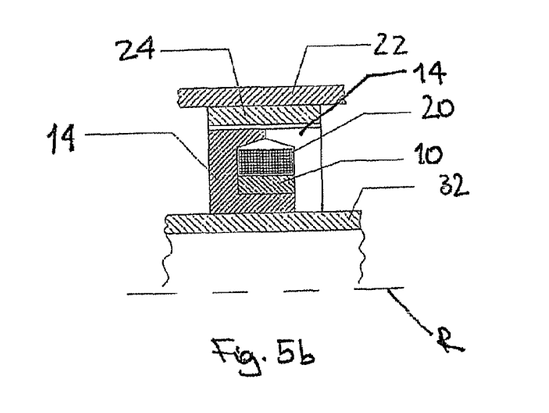

FIG. 5*b* shows an alternative embodiment of the stator arrangement according to the invention for an outer rotor machine. Corresponding parts are designated by the same reference numbers. In the embodiment of FIG. 5*b*, the stator poles 12, 14 are fixed to the stator back yoke 10 by an inner stator sleeve 32 that can be connected to a flange or to another component attached to the housing (not illustrated) of the transverse flux machine. The rotor comprises a rotor back yoke 22 and a permanent magnet ring 24 and encloses the stator arrangement coaxially. As in the embodiment of FIG. 5*b*, the pole shoes or claws are designed such that they do not overlap one another in an axial direction.

Figure 5C:
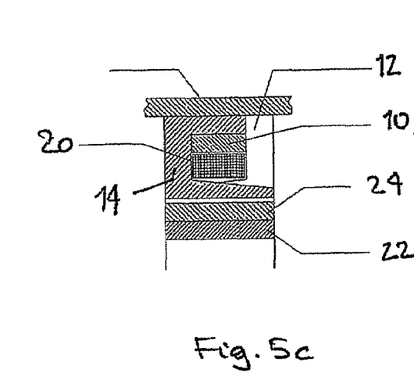
Figure 5D:
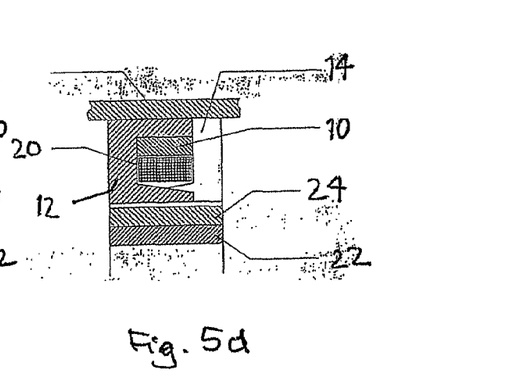

FIGS. 5*c* and 5*d* show modifications on the embodiment of FIG. 5*a*, in which the pole shoes overlap one another in an axial direction, either fully or partially.

Figure 6:
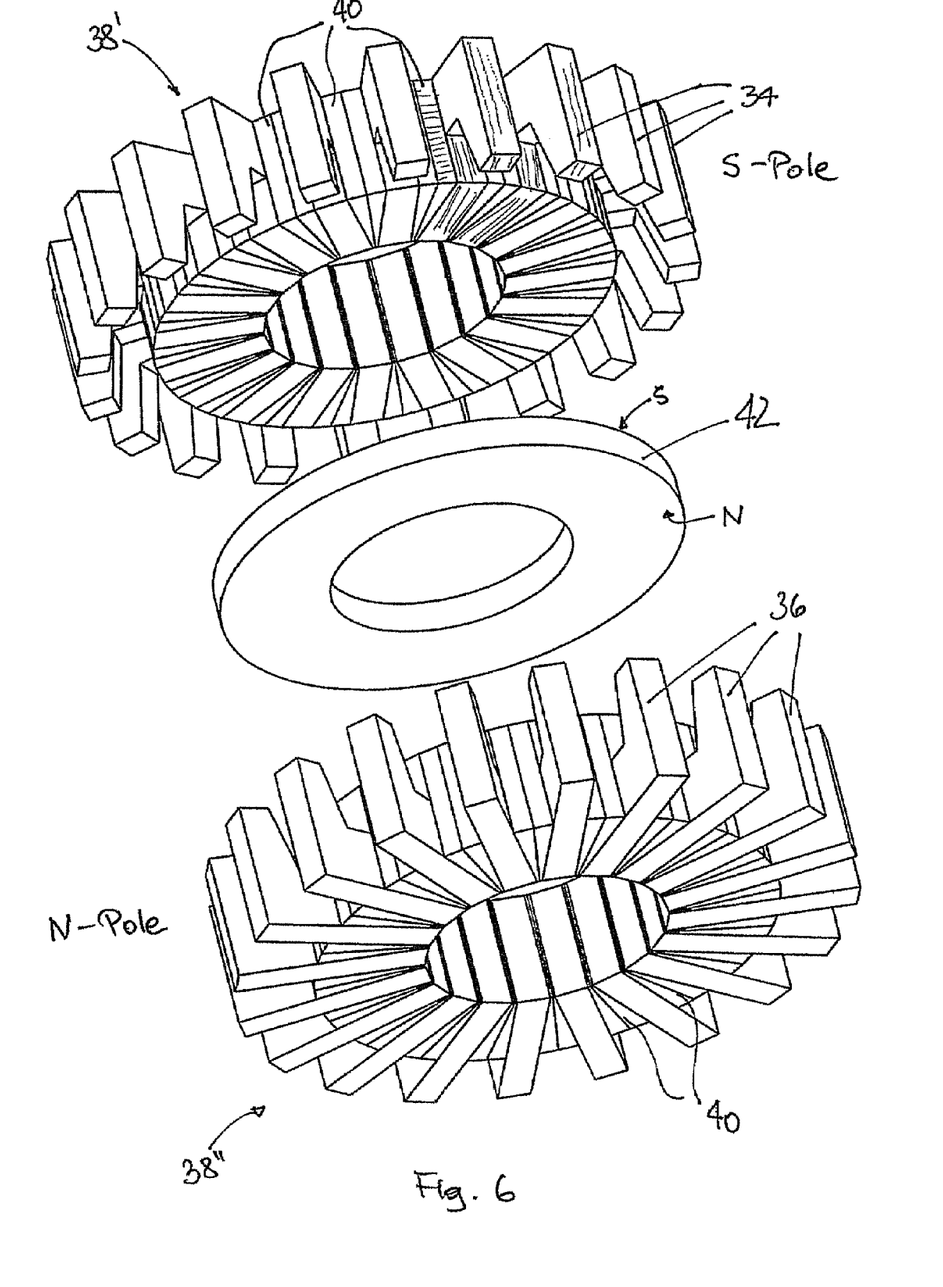
FIG. 6 is a perspective, exploded view of a rotor arrangement according to the invention.

FIG. 6 shows a schematic, exploded view of the rotor arrangement according to an embodiment of the invention. The rotor arrangement comprises a number of rotor poles 34, 36 that are designed in the manner of claw poles and are connected to each other such that they form an annular rotor body that is made up of two halves 38', 38". The individual rotor poles 34, 36 are connected to each other via wedge-shaped connecting sections 40. A unipolar ring magnet 42 is inserted in the space between the claws of the rotor body halves 38', 38", the unipolar ring magnet 42 having an S-pole, for example, on the side facing the rotor body half 38', and a N-pole on the opposite side.

The rotor body halves 38', 38" are joined together over the ring magnet 42 such that an S rotor pole 34 always comes to lie between two N rotor poles 36. The rotor arrangement is fixed as a whole by means of a non-magnetic sleeve (not illustrated in FIG. 6).

According to the invention, the rotor poles 34, 36 are formed by laminated stacks of metal sheets whose laminations are stacked in a tangential direction. This makes it possible to optimize the conduction of the magnetic flux through the rotor poles. The connecting sections 40 can be made of plastics or any other non-magnetic solid material, although it is also possible to form them from a stack of metal sheets as well. The function of the connecting sections 40 is to mechanically couple the individual rotor poles 34 or 36, however, they do not take part in the conduction of flux. A back yoke is not necessary since the magnetic flux is conducted entirely through the rotor poles 34, 36 and the ring magnet 42, as can better be seen in the view shown in FIG. 7. The construction according to the invention is particularly suitable for large machines having a large number of poles, e.g. >40, 60 or 80 poles, one purpose being to facilitate the manufacture of the correspondingly heavy rotor body halves and make it more manageable. It is also possible to make the rotor body out of solid material, either partially or fully.

Figure 7:
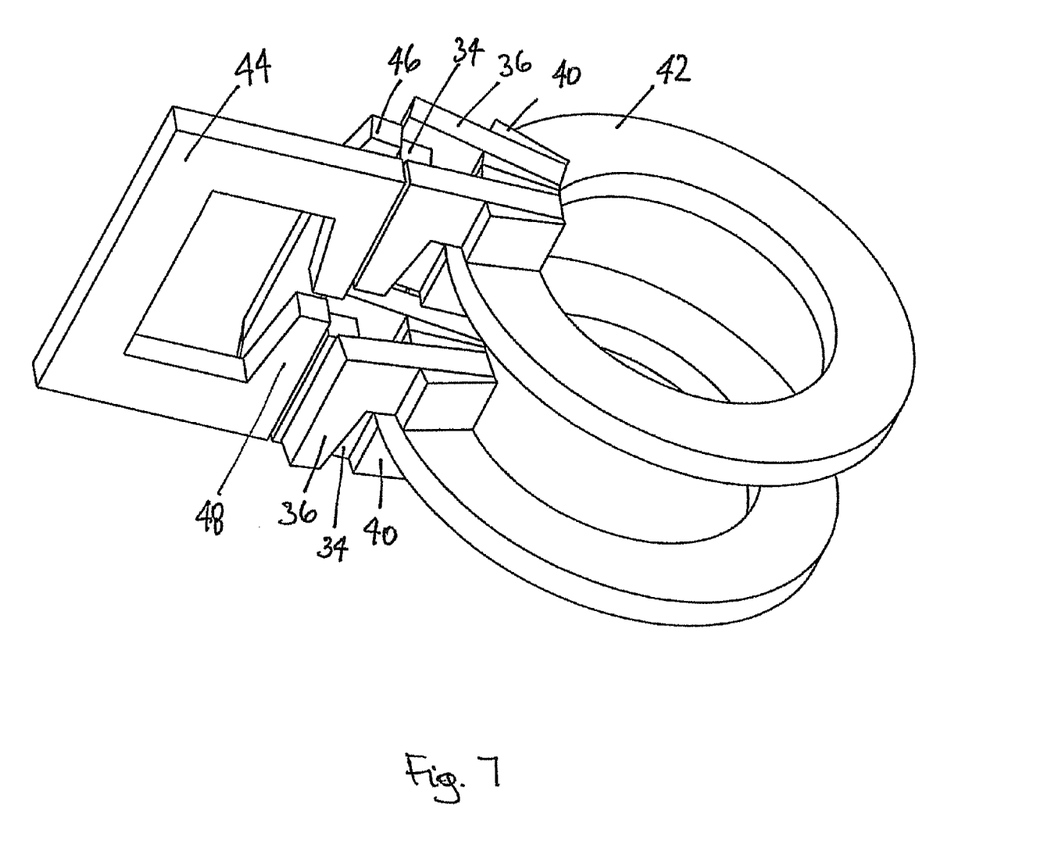
FIG. 7 is a perspective schematic view of parts of the rotor arrangement according to the invention in conjunction with a stator that is made up of U-cores and I-cores.

FIG. 7 shows a part of the rotor arrangement according to the invention in combination with a stator that is illustrated schematically by a U-shaped back yoke and an I-shaped back yoke 46. These kinds of stator arrangements used in transverse flux machines are basically known. In the case of the embodiment of the invention illustrated in FIG. 7, each leg of the U-shaped back yoke 44 is associated with a rotor arrangement whose rotor poles 36, 34 are designed according to the invention in the manner of claw poles. For the purpose of increasing the magnetic flux and useful output power, the pole shoes 48 of the U-shaped back yoke 44 are extended in an axial direction.

A comparison between FIGS. 6 and 7 shows that in the embodiment of FIG. 6 the opposing claw poles approximately touch each other, as in FIG. 5*b*, whereas the claw poles in FIG. 7 overlap one another fully. In the arrangement according to FIG. 7, the claw pole overlap is suitable for making the entire length of the pole available for receiving the magnetic flux in the desired stator configuration. In the case of the embodiment according to FIG. 6, which does not use U-shaped and I-shaped stator elements, the flux flows from one claw via the stator to another claw. A large overlap could result in a direct flow between the pole claws, which would be unwelcome. Therefore, given a large number of poles and correspondingly narrow claw spacings, the smallest possible overlap is desirable.

For the purpose of clarifying the invention, FIG. 8 again shows the construction of a stator of this kind that is made up of U-shaped back yokes 44 and I-shaped back yokes 46, although this stator is not a subject matter of the invention.

Figure 8:
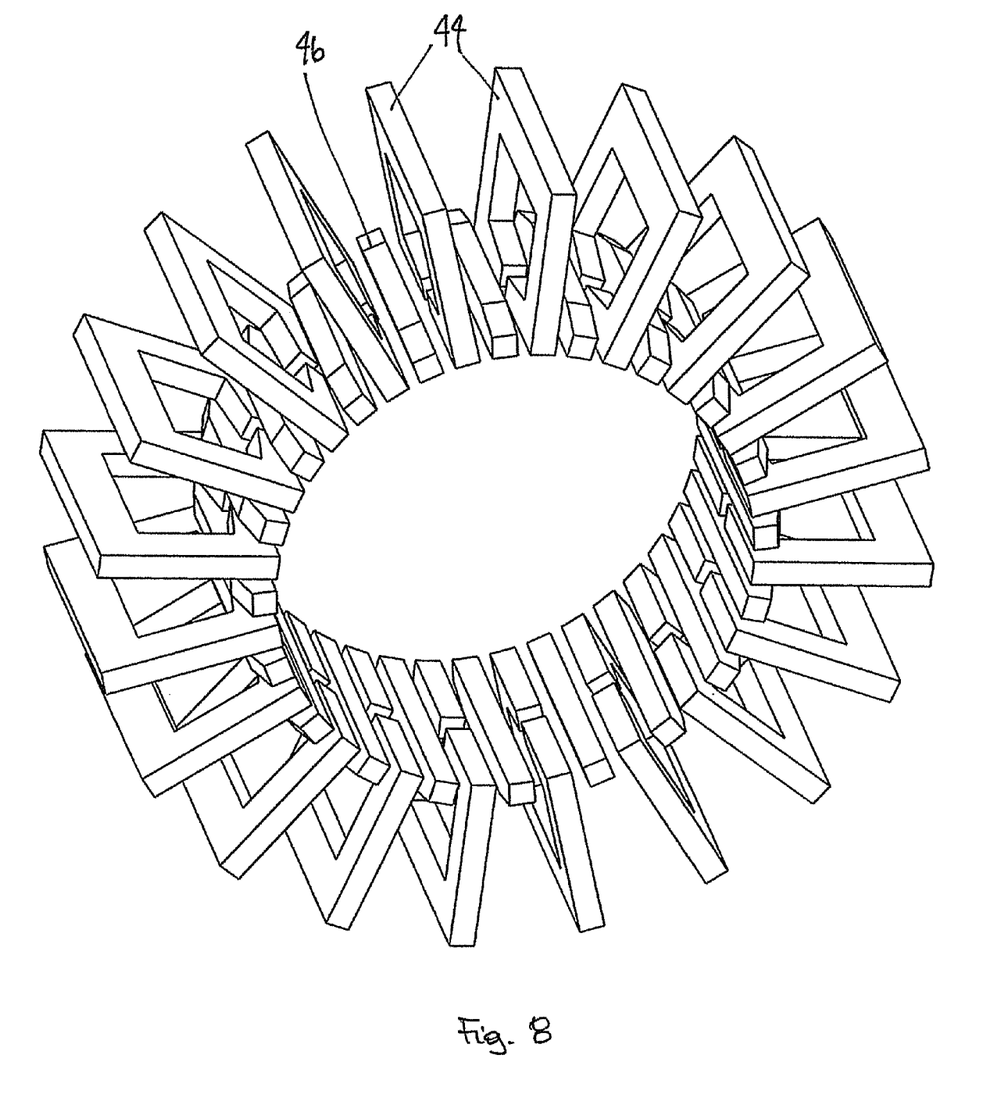
FIG. 8 is a perspective schematic view of a stator made up of U-cores and I-cores for the purpose of explaining the invention.
Figure 9:
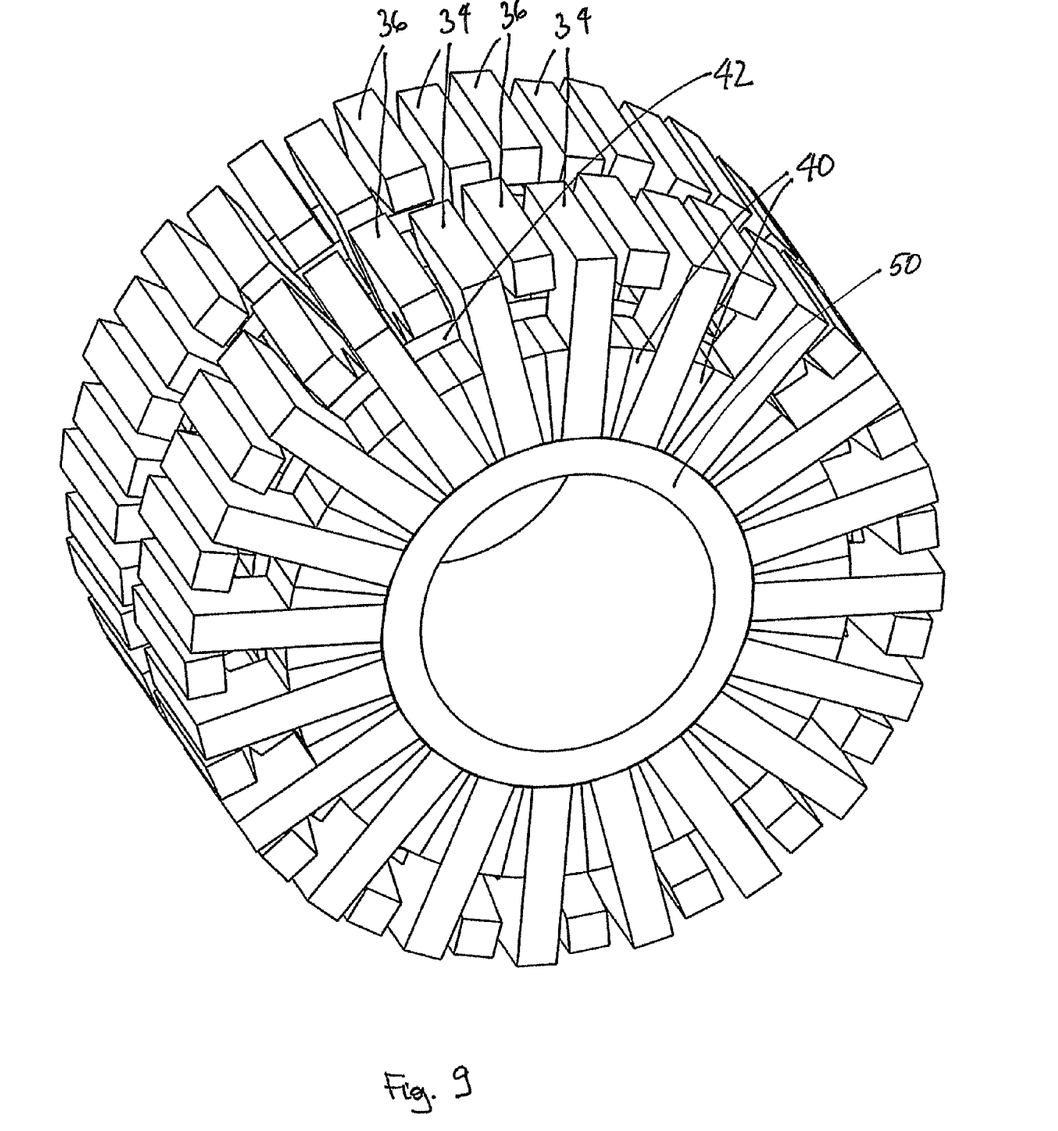
FIG. 9 is a perspective view of two rotor arrangements according to the invention which can be employed in combination with the stator of FIG. 8.

FIG. 9 shows a rotor that can, for example, be used in combination with the stator of FIG. 8. This rotor comprises two rotor arrangements that are associated with the two legs of the U-shaped back yokes 44. In the view shown in FIG. 9, a rotor sleeve 50 can also be seen which is used to fix the rotor arrangement. The rotor sleeve 50 is made of a non-magnetic material in order to prevent a short circuit between the north and south poles of the rotor arrangement.

Figure 10:
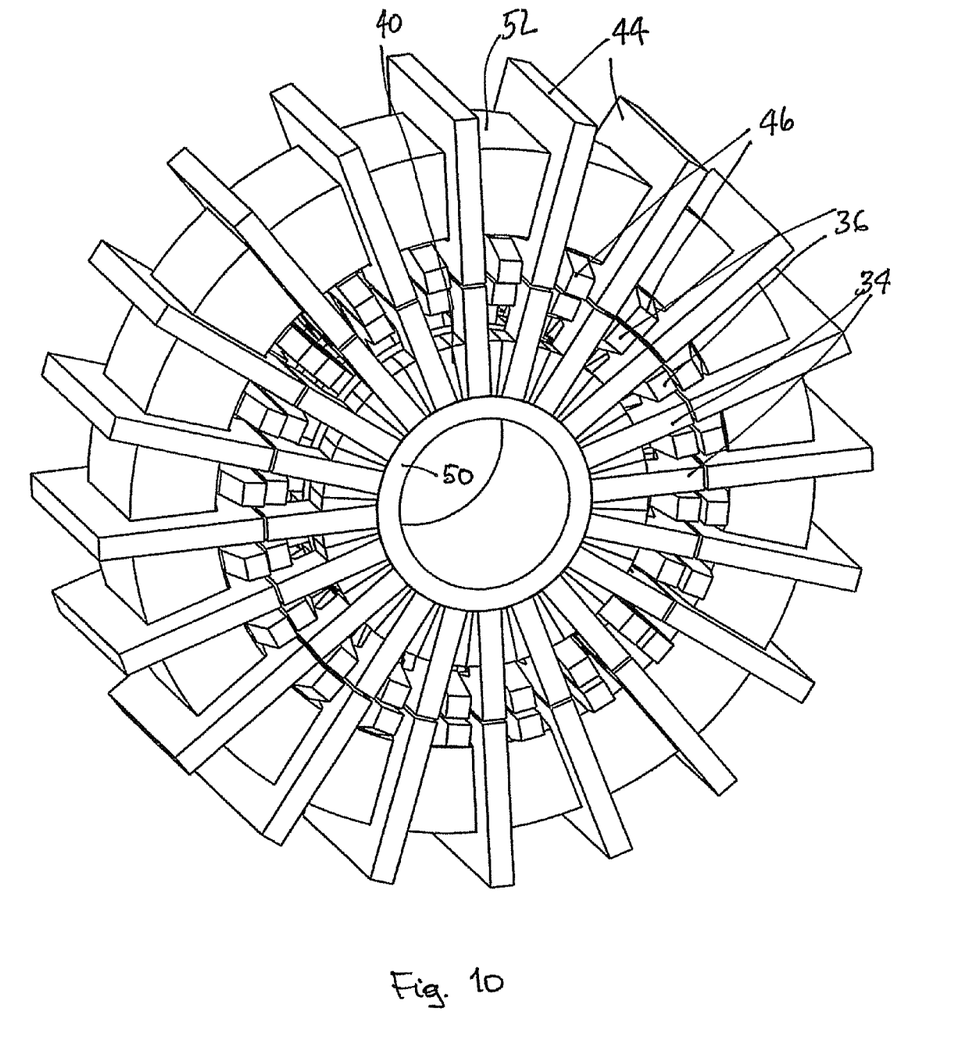
FIG. 10a is a perspective schematic view of one phase of a transverse flux machine that uses the rotor arrangement according to the invention.

FIG. 10 again shows a perspective view of an inner rotor transverse flux machine in an assembled state, the rotor arrangement being constructed according to the invention and the stator being made up of U-shaped and I-shaped back yokes 44, 46. A winding 52 is enclosed by the U-shaped and I-shaped back yokes 44, 46.

Figure 11A:
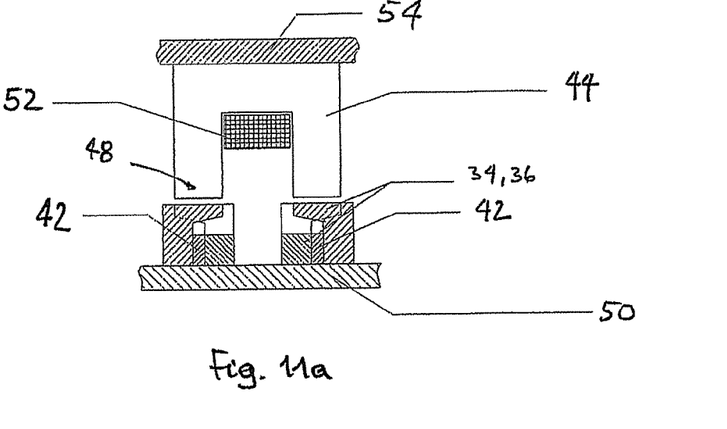
FIG. 11a, 11b and 11c are sectional views through the rotor arrangement according to the invention that can be used in combination with various stator types.
Figure 11B:
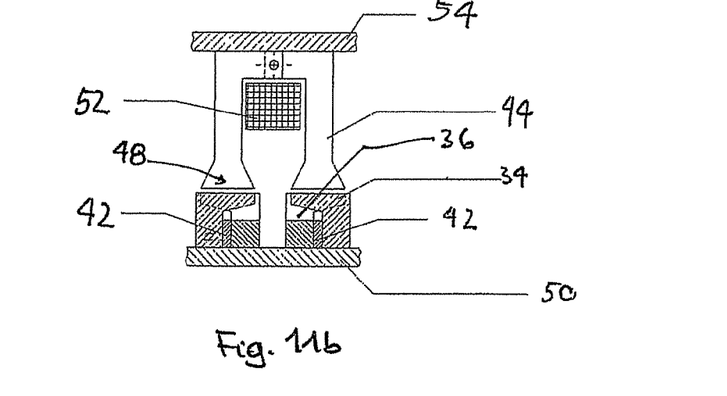
Figure 11C:
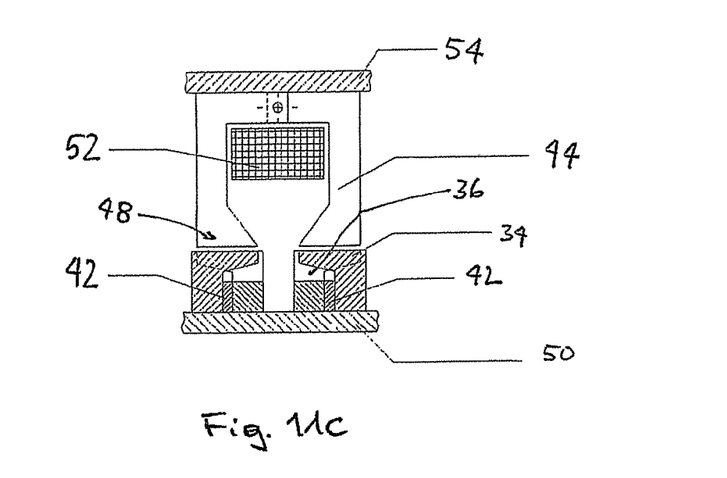

FIGS. 11*a*, 11*b* and 11*c* show sectional views through various embodiments of a transverse flux machine that contains the rotor arrangement according to the invention. In each sectional view the U-shaped back yoke 44 of the stator is shown, the back yoke 44 being fixed in a housing 54. Each of the two legs of the U-shaped back yoke 44 is associated with a rotor arrangement according to the invention, which is held on a rotor sleeve 50. The rotor arrangements of FIGS. 11*a*, 11*b* and 11*c* are identical to a large extent. The stators differ from each other particularly with regard to the design of the pole shoes 48 at the free ends of the two legs of the U-shaped back yoke 44. These pole shoes may widen on one side or on both sides, wherein the U-shaped back yoke 44 in the embodiments of FIGS. 11*b* and 11*c* may be formed in two pieces in order to facilitate the insertion of the winding 52. It is conceivable that two sections of the U-shaped back yoke 44 are joined together by means of screws, rivets or bolts, by interlocking and/or an interference fit with a clamping device, or any other suitable means of connection.

In the illustrated embodiment, the axial length of the pole shoes 48 is less than the corresponding dimension of the rotor claws, in order to optimally exploit the magnetic material of the ring magnet 42 and to provide sufficient flux density. However, the axial extension of the pole shoes could be slightly larger than the corresponding dimension of the rotor arrangement.

Figure 12:
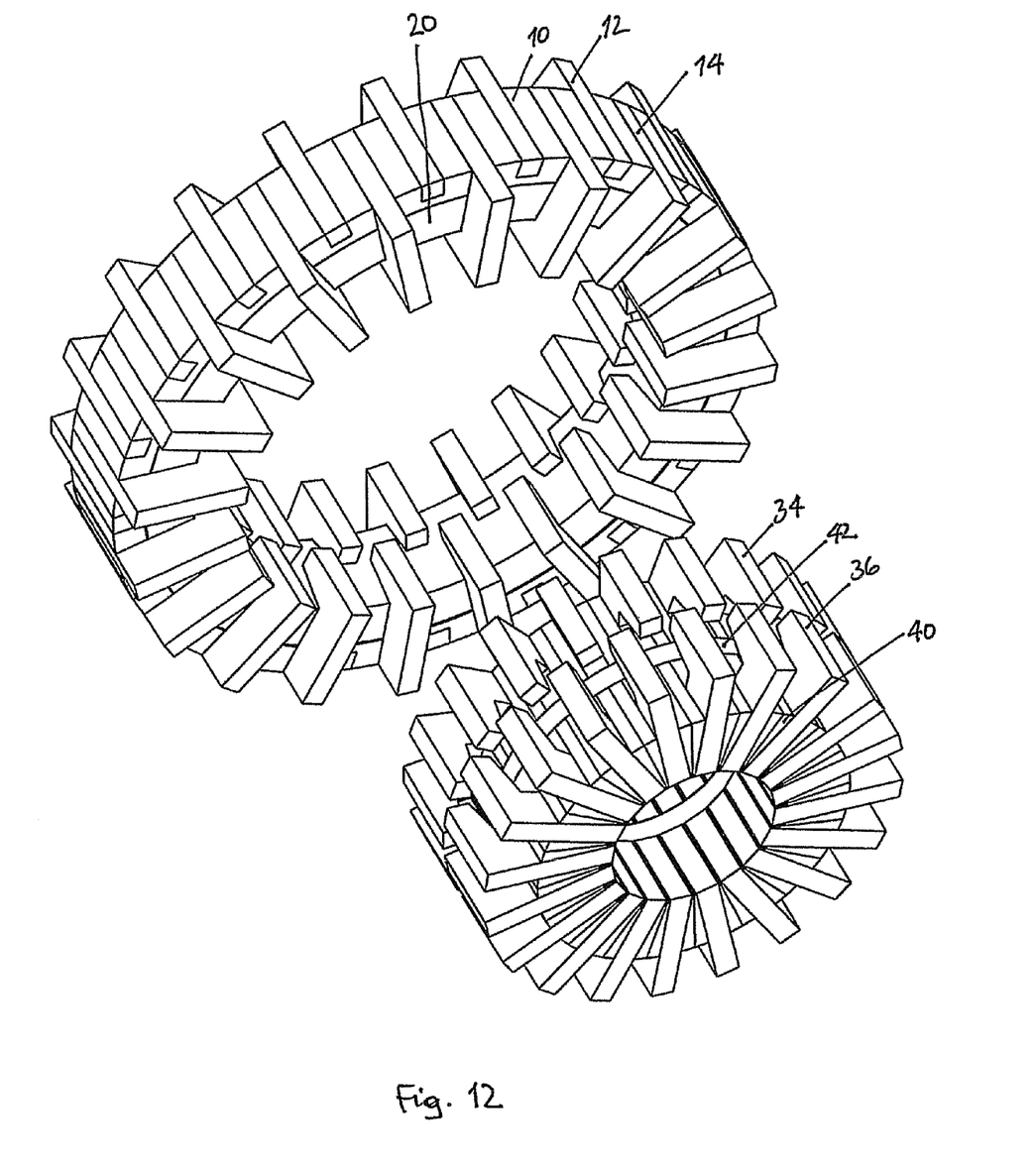
FIG. 12 is a perspective, exploded view of one phase of a transverse flux machine according to the invention.
Figure 13:
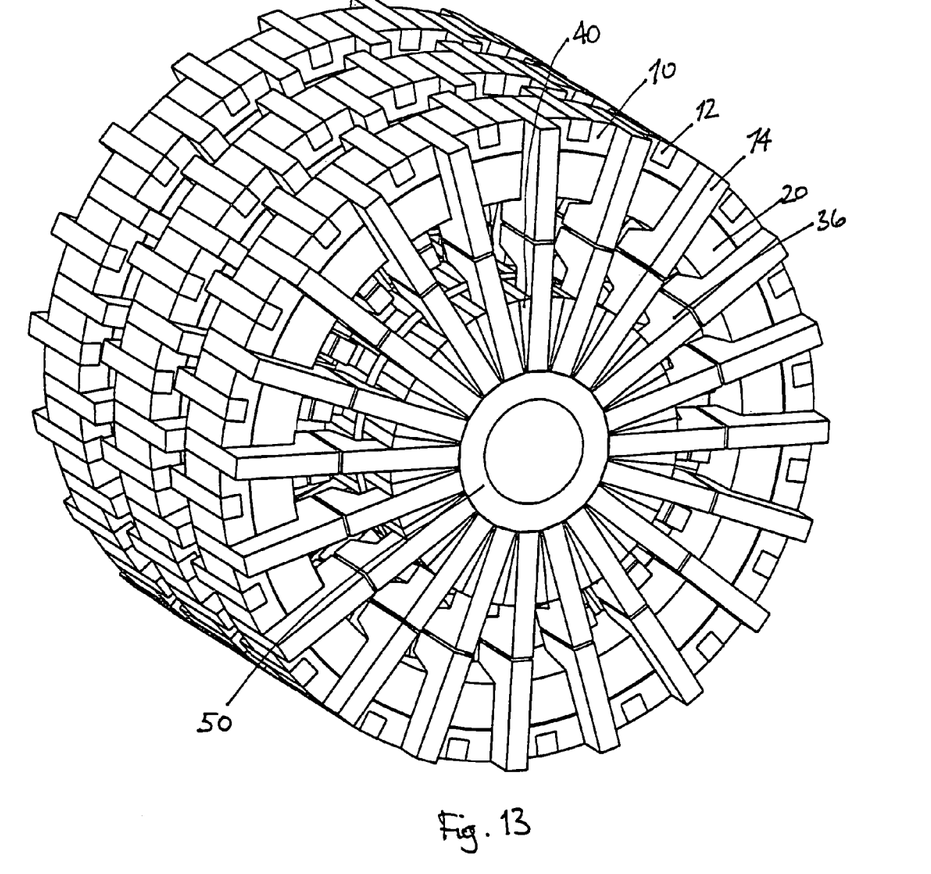
FIG. 13 is a perspective view of a three-phase transverse flux machine according to the invention.

FIG. 12 finally shows an exploded, perspective view of the combination of the stator arrangement according to the invention together with the rotor arrangement according to the invention to form one phase of a transverse flux machine. FIG. 13 shows a corresponding perspective view of a three-phase transverse flux machine in an assembled state. Identical components are designated by the same reference numbers as used in the preceding embodiments and are not described again in detail. The combination of the rotor arrangement according to the invention and the stator arrangement according to the invention in a transverse flux machine has the advantage that the construction of the rotor and the stator is made easier than in comparable transverse flux machines having a large number of poles. The choice of the direction of lamination of the stator poles or the rotor poles according to the invention makes it possible to optimize the conduction of magnetic flux. The claw pole design of the stator and rotor makes it possible to increase the energy density of the transverse flux machine. The unipolar design of the ring magnet of the rotor allows the magnetic material to be used economically. The use of laminated claw poles reduces magnetic losses due to pulsation.

Figure 14:
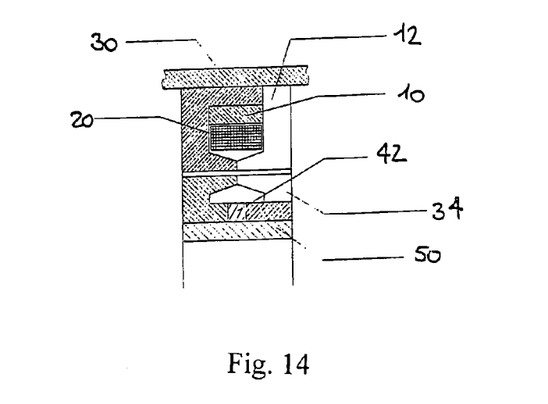
FIG. 14 is a sectional view through the transverse flux machine according to the invention.

FIG. 14 shows a sectional view through the transverse flux machine of FIG. 13, the stator arrangement being held in the housing 30 in the machine and the rotor arrangement being accommodated in a rotor sleeve 50.

The features disclosed in the above description, the claims and the figures can be important for the realization of the invention in its various embodiments both individually and in any combination whatsoever.

IDENTIFICATION REFERENCE LIST

10 Stator back yoke
12, 14 Stator poles
16 Recesses
18 Projections
20 Winding
22 Rotor back yoke
24 Permanent magnet ring
26 Shaft
28 Pole shoes
30 Housing
32 Stator sleeve
34, 36 Rotor poles
38', 38" Rotor body-halves
40 Connecting sections
42 Ring magnet
44 U-shaped back yoke
46 I-shaped back yoke
48 Pole shoes
50 Rotor sleeve
52 Winding
54 Housing
M Magnetic flux
S Flow of current
R Rotational axis

We claim:

1. A stator arrangement for a transverse flux machine, the stator arrangement comprising:
    an annular stator back yoke,
    a number of stator poles that are designed in the manner of claw poles each having a radially extending portion and an axially extending peripheral projection, and
    a stator winding that is located radially inwards of the stator back yoke, axially between the radially extending portions of the stator poles, and radially inwards of the axially extending peripheral projections of the stator poles, wherein
    the stator back yoke is made of a first laminated stack of metal sheets whose laminations are stacked in an axial direction, and the stator poles are made of second laminated stacks of metal sheets whose laminations are stacked in a tangential direction.

2. A stator arrangement according to claim 1, wherein the stator back yoke and the stator poles are connected to each other by a plug-in connection using recesses and projections.

3. A stator arrangement according to claim 1, wherein the stator back yoke has recesses at its circumference and the stator pole projections engage with the recesses.

4. A stator arrangement according to claim 1, wherein a stator sleeve is provided that is mounted on the circumference of the stator arrangement.

5. A stator arrangement according to claim 1, wherein the stator poles of different polarity are mounted alternately on the stator back yoke from opposite end faces of the stator back yoke.

6. A stator arrangement according to claim 1, wherein the pole claws of the stator poles of different polarity at least partially overlap one another in an axial direction.

7. A rotor arrangement for a transverse flux machine, the rotor arrangement comprising two opposing rotor body halves each half having:
    a number of rotor poles that are designed in the manner of claw poles, the rotor poles being connected to each other such that they form an annular rotor body half, and
    a unipolar ring magnet magnetized in an axial direction that is located between the opposing rotor poles of the rotor body halves,
    wherein the rotor poles are made of laminated stacks of metal sheets whose laminations are stacked in a tangential direction and wherein the rotor poles are connected to each other via intermediate wedges.

8. A rotor arrangement for a transverse flux machine, the rotor arrangement comprising two opposing rotor body halves, each half having:
    a number of rotor poles that are designed in the manner of claw poles, the rotor poles being connected to each other such that they form an annular rotor body half, and
    a unipolar ring magnet magnetized in an axial direction that is located between the opposing rotor poles of the rotor body halves,
    wherein the rotor poles are made of laminated stacks of metal sheets whose laminations are stacked in a tangential direction and wherein a rotor sleeve is provided that is mounted on the circumference of the rotor arrangement.

9. A rotor arrangement for a transverse flux machine, the rotor arrangement comprising two opposing rotor body halves, each half having:
    a number of rotor poles that are designed in the manner of claw poles, the rotor poles being connected to each other such that they form an annular rotor body half, and
    a unipolar ring magnet magnetized in an axial direction that is located between the opposing rotor poles of the rotor body halves,
    wherein the rotor poles are made of laminated stacks of metal sheets whose laminations are stacked in a tangential direction and wherein the pole claws of the rotor poles of different polarity at least partially overlap one another in an axial direction.

10. A transverse flux machine having a stator arrangement for a transverse flux machine, the stator arrangement comprising:

an annular stator back yoke, a number of stator poles that are designed in the manner of claw poles each having a radially extending portion and an axially extending peripheral projection, and a stator winding that is located radially inwards of the stator back yoke, axially between the radially extending portions of the stator poles, and radially inwards of the axially extending peripheral projections of the stator poles, wherein the stator back yoke is made of a first laminated stack of metal sheets whose laminations are stacked in an axial direction, and the stator poles are made of second laminated stacks of metal sheets whose laminations are stacked in a tangential direction and a rotor arrangement for a transverse flux machine, the rotor arrangement comprising two opposing rotor body halves, each half having:

a number of rotor poles that are designed in the manner of claw poles, the rotor poles being connected to each other such that they form an annular rotor body half, and a unipolar ring magnet magnetized in an axial direction that is located between the opposing rotor poles of the rotor body halves, wherein the rotor poles ate made of laminated stacks of metal sheets whose laminations are stacked in a tangential direction, wherein the stator arrangement and the rotor arrangement are disposed coaxially with respect to one another and the pole claws of the stator poles and the pole caws of the rotor poles are located opposite each other and have the same angular distance to one another.

11. A transverse flux machine having a rotor arrangement according to claim 10 and a stator arrangement that has substantially U-shaped back yokes and substantially I-shaped back yokes that are assembled alternately to form a stator ring, the legs of the U-shaped back yokes forming stator poles that are located opposite the corresponding rotor poles of the rotor arrangement.

* * * * *